United States Patent
Mitsui et al.

[11] Patent Number: 6,157,309
[45] Date of Patent: *Dec. 5, 2000

[54] BATTERY PACK

[75] Inventors: Hidero Mitsui; Toshio Koyama, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/225,391

[22] Filed: Jan. 5, 1999

Related U.S. Application Data

[63] Continuation of application No. 09/047,110, Mar. 24, 1998, which is a continuation of application No. 08/758,153, Nov. 24, 1996, Pat. No. 5,805,069.

[30] Foreign Application Priority Data

Dec. 6, 1995 [JP] Japan ................................. 7-344978

[51] Int. Cl.⁷ ..................................................... G08B 21/00
[52] U.S. Cl. ........................... 340/636; 340/635; 320/106
[58] Field of Search ..................................... 340/635, 636; 429/90, 97, 98, 96, 99; 320/106, 114, 136, 112, DIG. 18, DIG. 21

[56] References Cited

U.S. PATENT DOCUMENTS

| | | | |
|---|---|---|---|
| 5,206,097 | 4/1993 | Burns et al. | 429/90 |
| 5,352,968 | 10/1994 | Reni et al. | 320/35 |
| 5,399,446 | 3/1995 | Takahashi | 429/90 |
| 5,534,765 | 7/1996 | Kreisinger et al. | 320/106 |
| 5,602,454 | 2/1997 | Arakawa et al. | 320/106 |
| 5,604,050 | 2/1997 | Brunette et al. | 429/97 |
| 5,626,979 | 5/1997 | Mitsui et al. | 429/97 |
| 5,672,441 | 9/1997 | Aoki et al. | 429/97 |
| 5,697,070 | 12/1997 | Liebler | 455/90 |
| 5,766,794 | 6/1998 | Brunette et al. | 429/97 |
| 5,805,069 | 9/1998 | Mitsui et al. | 340/636 |

FOREIGN PATENT DOCUMENTS

| | | |
|---|---|---|
| 0 572 327 | 12/1993 | European Pat. Off. . |
| 0 661 769 | 7/1995 | European Pat. Off. . |
| 2 279 802 | 1/1995 | United Kingdom . |

*Primary Examiner*—Daniel J. Wu
*Assistant Examiner*—Van T. Trieu
*Attorney, Agent, or Firm*—Frommer Lawrence & Haug, LLP; William S. Frommer; Matthew K. Ryan

[57] ABSTRACT

In a battery pack, it is difficult that information on a contained battery of the battery pack, such as the accurate state of charge of the battery, is detected at an external equipment. A communication terminal which can communicate the state of charge of the contained battery to the external equipment is provided on the installation surface on which power supply terminals of the battery pack are provided or on the surface adjacent to the installation surface. This allows the corresponding electrodes or the like of the external equipment to be concentrated at one place, so that the space required to arrange the corresponding electrodes or the like is reduced, thus downsizing the equipment.

7 Claims, 7 Drawing Sheets

＃ BATTERY PACK

This application is a continuation of Ser. No. 09/047,110 filed Mar. 24, 1998, which is a Continuation of Ser. No. 08/758,153 Nov. 24, 1996, U.S. Pat. No. 5,805,069.

BACKGROUND OF THE INVENTION

1. Field of the Invention

This invention relates to a battery pack, and more particularly, is applicable to a battery pack which supplies DC power to electric equipment.

2. Description of the Related Art

Figure 1:
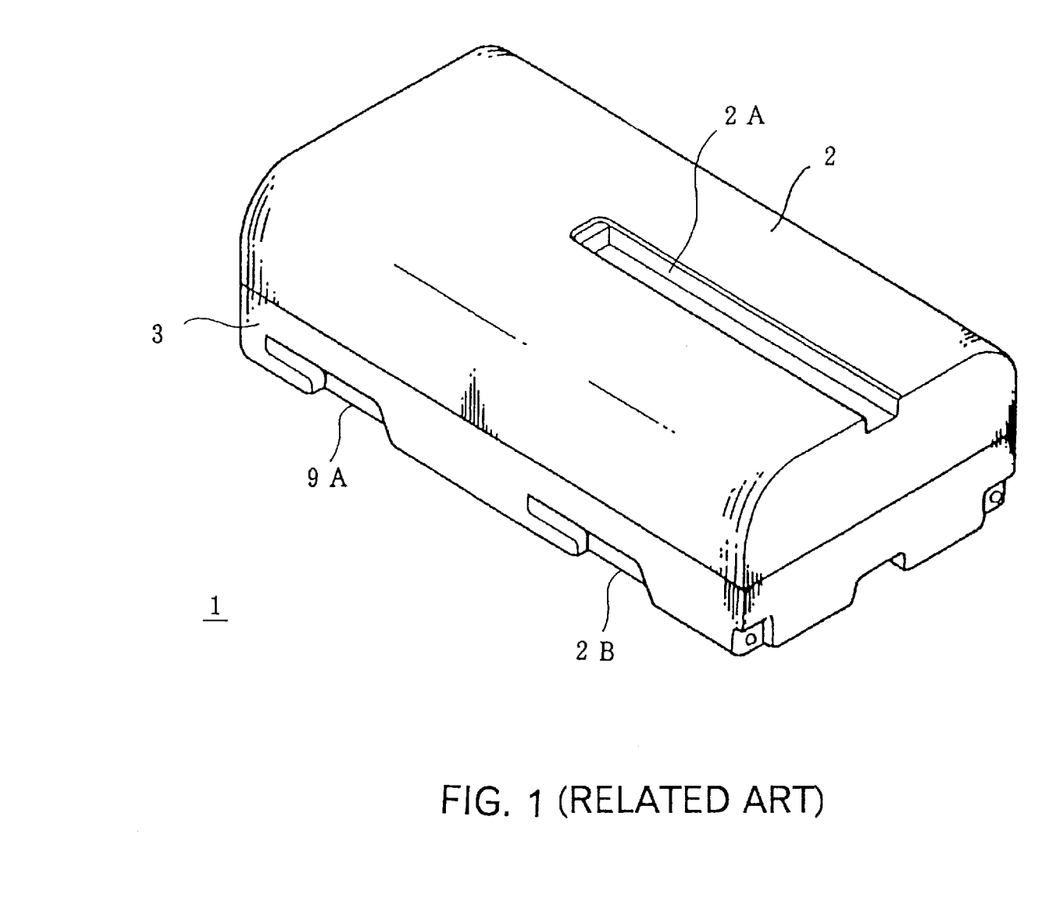
FIG. 1 is a perspective diagram showing the constitution of a conventional battery pack.
Figure 2A:
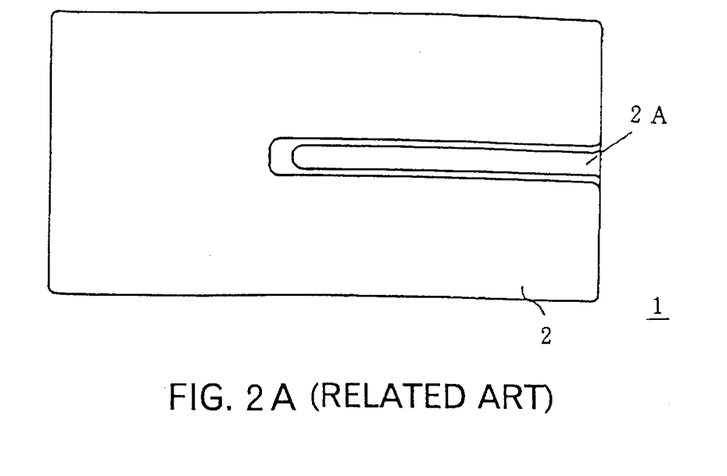
FIGS. 2A to 2C are schematic diagrams explaining a plane diagram, a side diagram, and a bottom diagram of a conventional battery pack.
Figure 2B:
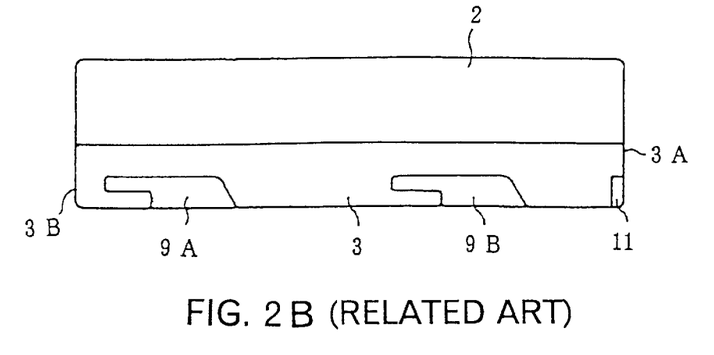
Figure 2C:
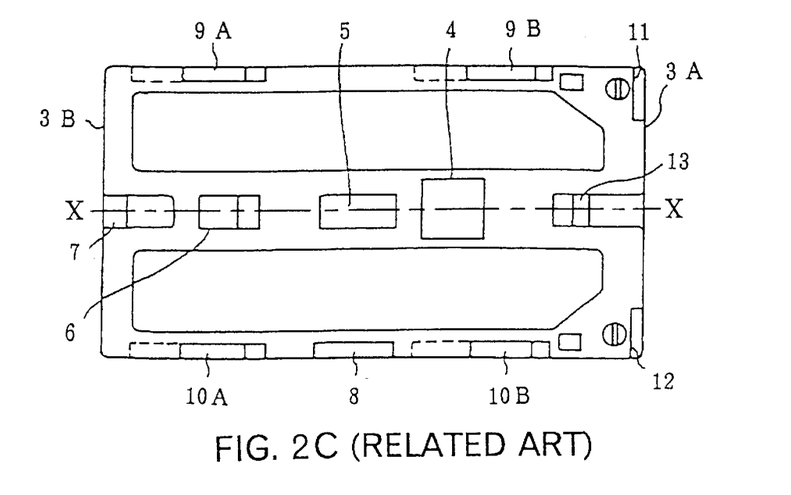

Today, many battery packs are commercially available, which contain one or more batteries to supply DC power to portable electronic equipment. A wide variety of battery packs, including those which are rechargeable or are not rechargeable and those which have their specific applications, are on the market. Electronic equipment therefore is likely to be loaded with inappropriate battery packs, thus causing the malfunction of the equipment or damage thereto. A mechanism that is intended to prevent an inappropriate battery pack from being accidentally loaded into electronic equipment is incorporated in battery packs. As an example, a battery pack for a videotape recorder with a camera is shown in FIGS. 1 and 2A to 2C. FIGS. 2A, 2B, and 2C are a plan view, a side view, and a bottom view of the battery pack, respectively.

The battery pack 1 comprises a case 4 consisting of an upper case 2 and a lower case 3, which are provided with a fitting mechanism to prevent the loading of an inappropriate battery pack. A groove 2A on top of the upper case 2 is for preventing the battery pack from being inserted into equipment in an incorrect direction. The battery pack is designed so that if the battery pack is by accident inserted into equipment in an opposite direction, a part of the upper case 2 that is not grooved rests against a guide rail in the equipment to prevent the battery pack from being inserted into the equipment.

On the other hand, the lower case 3 is provided with concave portions 4, 5, 6, and 7 along the center line X—X and with a concave portion 8 along a side wall. The concave portions 5 and 8 are detection holes, and the concave portion 6 is a locking hole used to install the battery pack to electronic equipment of external battery installation type. More specially, the concave portion 4 is a spare detection hole and a detection hole indicating that the battery pack 1 contains a lithium ion battery, respectively. The concave portion 8 is a detection hole indicating that the battery pack 1 is rechargeable.

The lower case 3 is also provided at the sides and bottom thereof with grooves 9A, 9B, 10A, and 10B to install the battery pack to electronic equipment of external battery installation type. A marker 13 indicating the state of charge of the battery, which marker is installed on the side of the lower case 3 on which power supply terminals 11 and 12 are provided, allows it to be determined whether the battery pack 1 is fully charged or depleted.

As described above, a conventional battery pack is designed so that it can be determined, by seeing whether or not convex portions fit into corresponding detection holes, whether or not the battery pack is attachable to electronic equipment or a charger.

In these days electronic equipment has been required to perform more and more functions and provide more accurate information. Such information includes the state of charge of the battery and output current amperage.

SUMMARY OF THE INVENTION

In view of the foregoing, an object of this invention is to provide a battery pack in which information on a battery in a battery pack can accurately be communicated to external equipment.

The foregoing object and other objects of the invention have been achieved by the provision of a battery pack which comprises a communication terminal for communicating information on the state of charge of a contained battery to external equipment, the communication terminal being positioned on the installation surface on which the power supply terminals of the battery pack are provided or on a surface adjacent to the installation surface. This constitution allows the electrodes or the like of the external equipment, which correspond to the communication and power supply terminals, to be concentrated at one place and the space required to arrange the electrodes or the like to be saved, thus reducing the external equipment in size.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Structure of Battery Pack

Figure 3:
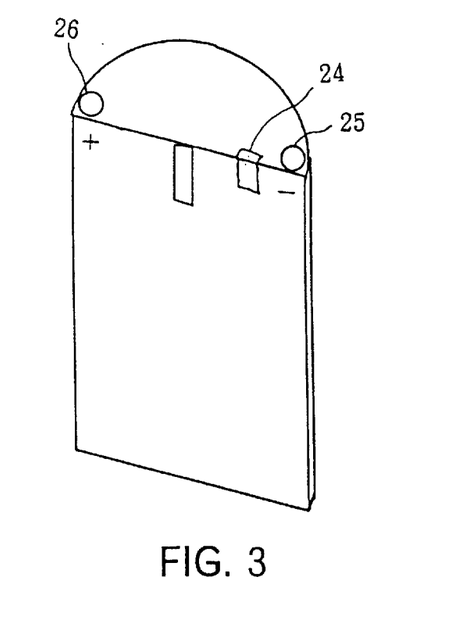
FIG. 3 is a schematic perspective diagram explaining a general constitution of a battery pack according to the present invention.
Figure 4:
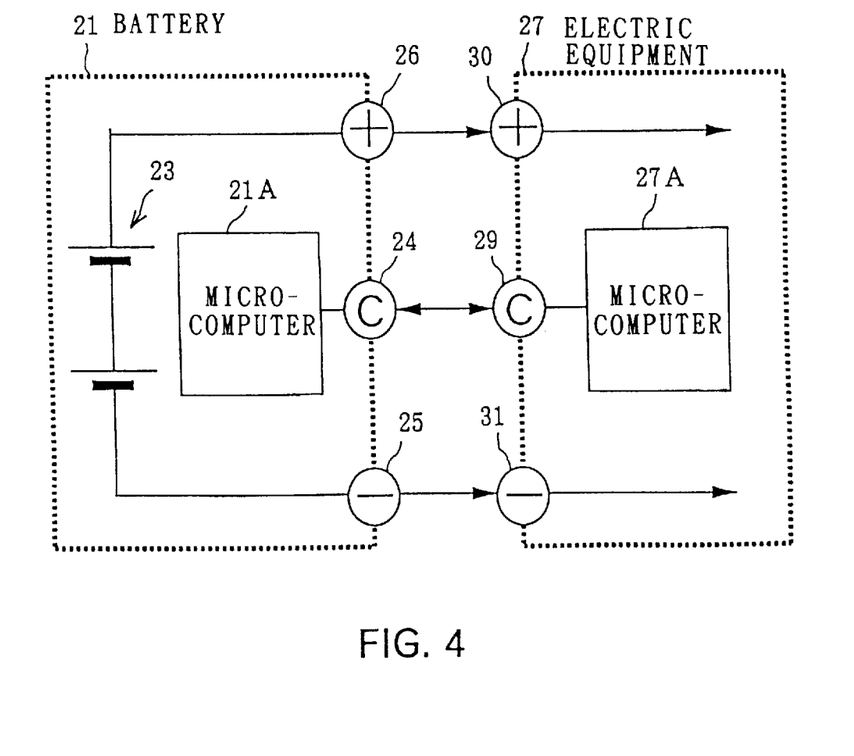
FIG. 4 is a schematic diagram explaining an electrical inner constitution of the battery pack shown in FIG. 3.

FIGS. 3 and 4 schematically show the appearance and internal constitution of a battery pack. First, a battery pack 21 is characterized in that accurate information on a contained battery 23 (such as amperage, voltage, and the state of charge of the battery), detected by a built-in microcomputer 21A, is communicated to a microcomputer 27A of external equipment 27 through a communication terminal 24.

Second, the battery pack 21 is characterized in that the communication terminal 24 is provided near either a negative (−) power supply terminal 25 or a positive (+) power supply terminal 26. In this example, the communication terminal 24 is provided near the negative (−) power supply terminal 25. This is because the negative (−) power supply of the microcomputer 21A is connected to the negative (−) power supply terminal 25, and overvoltage is prevented from being applied to the microcomputer 21A even if the communication terminal 24 and the negative (−) power supply terminal 25 are short-circuited by accident.

In addition, the communication terminal 24, which is provided to lie in both the front surface, on which the negative (−) power supply terminal 25 and positive (+) power supply terminal 26 are provided, and the bottom of the battery pack, and is intended to come in contact with a communication terminal of the external equipment no matter whether the front surface or the bottom comes in contact with the external equipment.

Next, FIGS. 5 and 6A to 6C show a more specific constitution of the battery pack 21. The constitution is basically the same as that of the battery pack 1 shown in FIGS. 1 and 2A to 2C, but differs from conventional constitutions in terms of groove length so that the battery pack 21 can mechanically be found to have a communication function. Basically, the battery pack 21 comprises a case consisting of an upper case 32 and a lower case 33.

Figure 5:
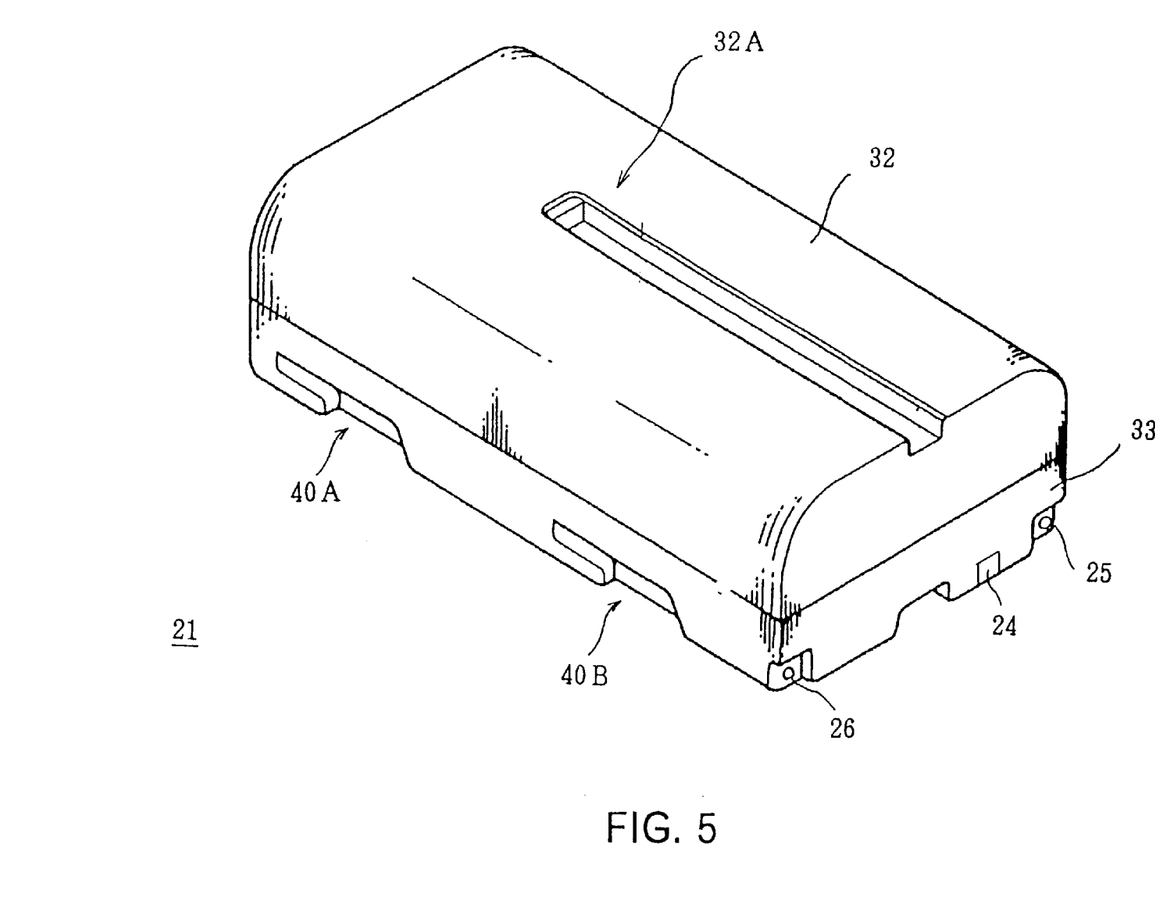
FIG. 5 is a perspective diagram showing the constitution of the battery pack according to the present invention.

For example, a groove 32A on top of the upper case 32 is formed to be longer than the groove 2A shown in FIG. 1. This difference in groove length detects, in the equipment side to be inserted, whether or not the battery pack incorporates a microcomputer. Thus only equipment that covers microcomputer-containing battery packs can be loaded with the battery pack 21. The groove 32A for preventing reverse battery pack insertion is designed to prevent a battery pack from being inserted into external equipment in an incorrect direction.

Figure 6A:
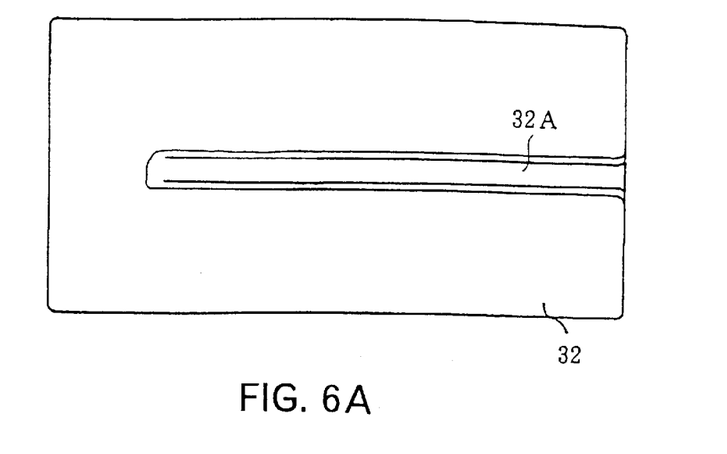
FIGS. 6A to 6C are schematic diagrams explaining a plan diagram, a side diagram, and a bottom diagram of the battery pack shown in FIG. 5.
Figure 6B:
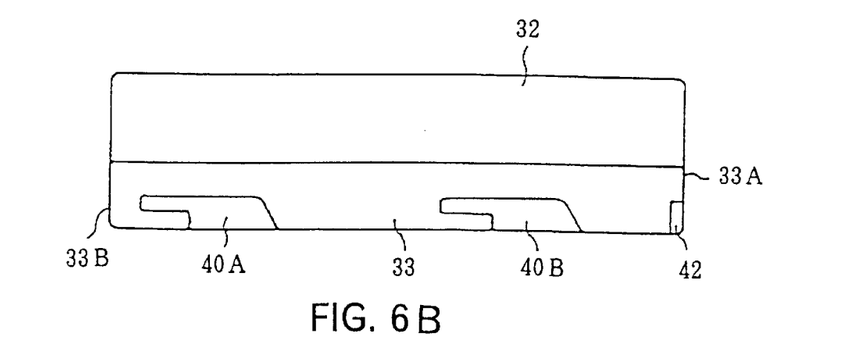
Figure 6C:
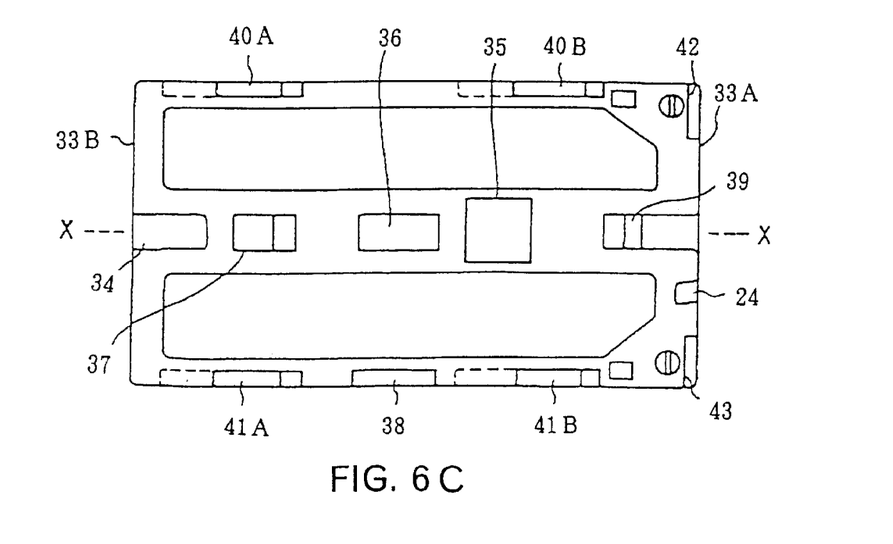

Further, a groove 34, similar to the groove 32A, provided at the bottom of the lower case 33 is formed to be longer than the groove 7 shown in FIG. 2C. In the case where the bottom of the lower case 33 comes in contact with the equipment into which the battery pack 21 is loaded, the groove 34 allows it to be determined whether the battery pack incorporates a microcomputer or not. Thus only equipment that covers microcomputer-containing battery packs can be loaded with the battery pack 21.

In addition, at the bottom of the lower case 33, concave portions 35, 36, and 37 are provided along a center line X—X, and a concave portion 38 is provided along a side wall.

The concave portion 36 indicates that the battery pack 21 contains a lithium ion battery. The concave portion 38 indicates whether the battery pack is rechargeable or not. The concave portion 37 is used for locking the battery pack when it is loaded into electronic equipment of external battery pack installation type. These concave portions 36 and 38 allow it to be determined whether or not the battery pack 21 can be installed in chargers or electronic equipment.

A marker 39 showing whether a battery is charged or not, installed on the center line X—X on the side of the power supply terminals 25 and 26, allows it to be determined whether the battery pack 21 is fully charged or depleted. For example, if the battery pack is fully charged, the whole marker 39 is exposed into the concave portion at which the marker 39 is positioned. On the other hand, if the battery pack is in use or depleted, the marker 39 is put away in the battery pack, so that the marker is partly exposed into the concave portion. When the battery pack is removed from a charger after charging is completed, the marker 39 is pulled out of the battery pack, and when the battery pack is loaded into equipment, a projection from the equipment pushes the marker 39 into the battery pack.

On the circumference of the bottom of the lower case 33, fitting grooves 40A and 40B having ribs are provided along one of the longer sides of the bottom, and fitting grooves 41A and 41B having ribs are provided along the other. When installed on a battery holder exposed on a surface of a charger or electronic equipment, the battery pack 21 fits into the projections of the battery holder to be secured.

At the front end 33A of the lower case 33, indented surfaces 42 and 43, a step down from the surroundings thereof, are formed, on which the power supply terminals 25 and 26 are provided.

As described above, the power supply terminals 25 and 26 are provided on the indented surfaces 42 and 43, a step down from the surface of the front end 33A. Since the indented surfaces therefore differ in level from the installation surface for the communication terminal 24, a conductive member or the like is not likely to short-circuit the communication terminal 24 and the negative (−) power supply terminal 25 by accident. The power supply terminals 25 and 26 function as charging electrodes when the battery pack 21 is installed in a charger for charging purposes, while the power supply terminals function as power supply electrodes when the battery pack 21 is loaded into electronic equipment for power supply purposes.

According to the battery pack 21 of the constitution, placing the communication terminal 24, which is used for communicating the information of the internal battery 23 detected by the built-in microcomputer 21A to external equipment, on the installation surface on which the power supply terminals 25 and 26 are provided or near the installation surface allows the communication terminal and power supply terminals of electronic equipment, into which the battery pack is loaded, to be concentrated at one place, thus reducing the terminal constitution of the electronic equipment in size.

(2) Structure of Equipment in which Battery Pack is Installed

Figure 7:
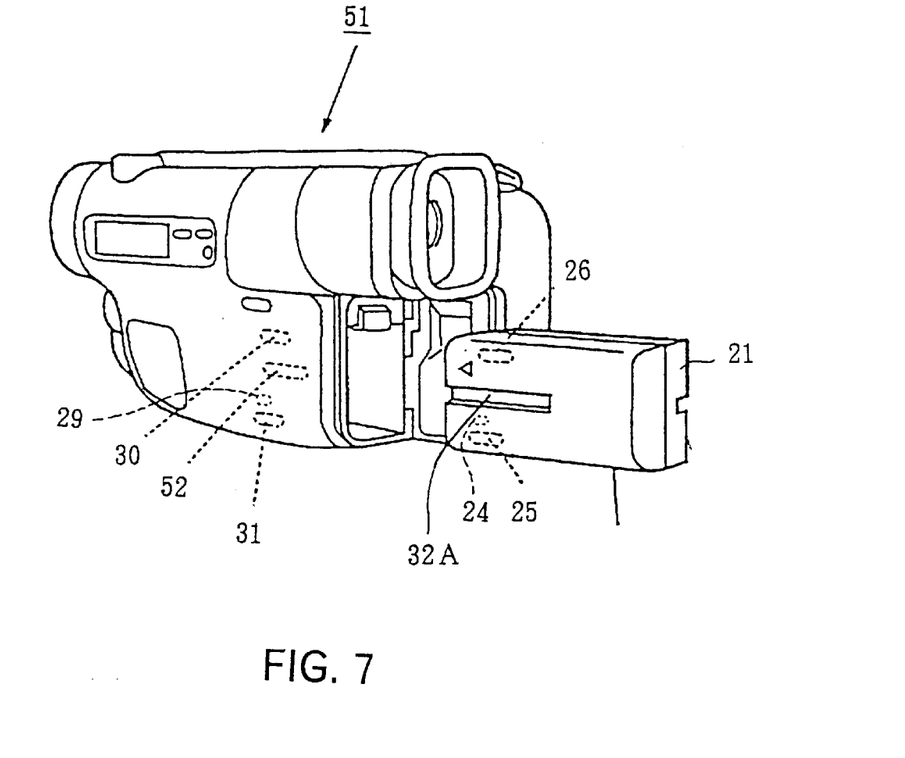
FIG. 7 is a schematic diagram showing an example of the constitution of equipment into which a battery pack is loaded.
Figure 8:
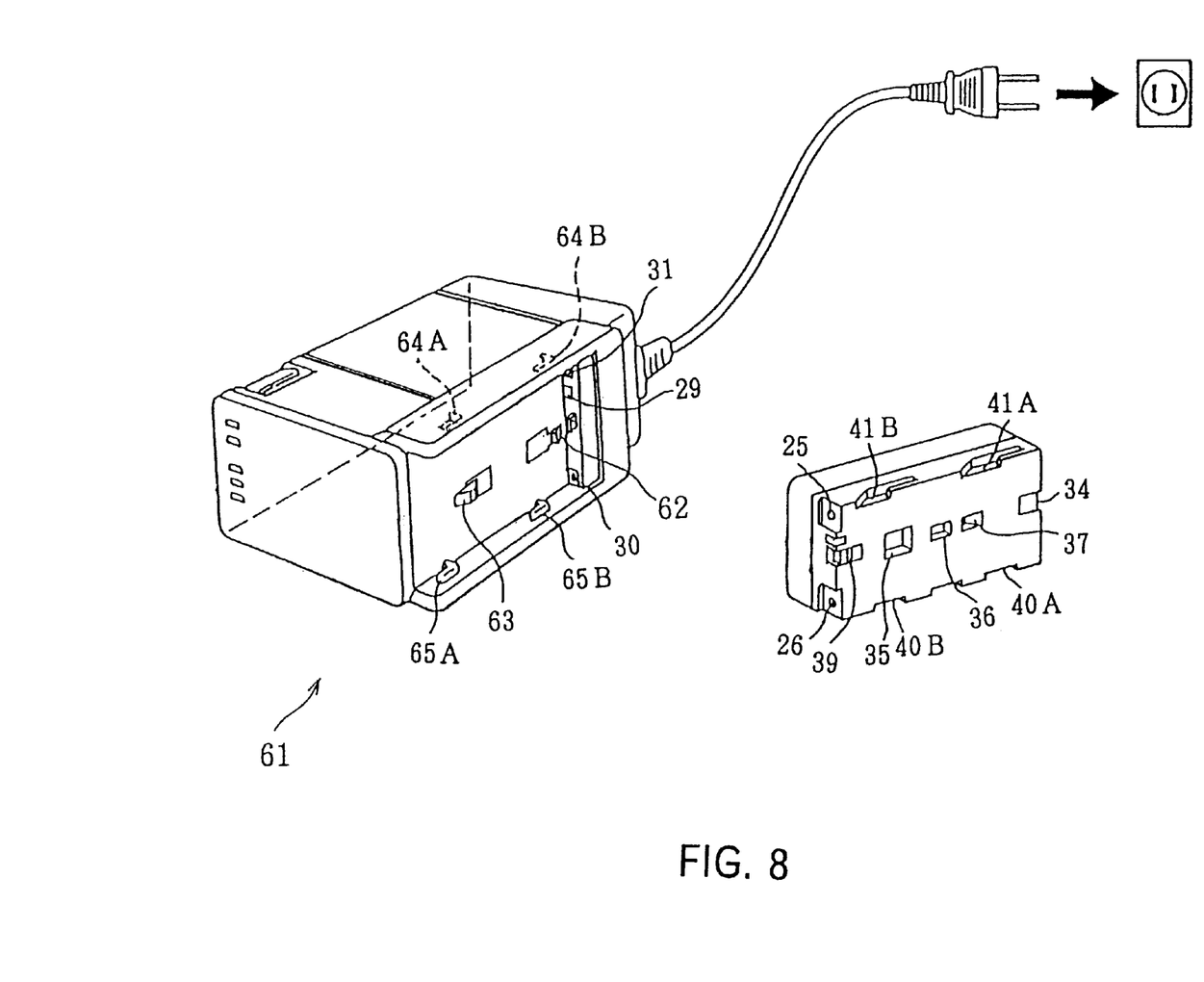
FIG. 8 is a schematic diagram showing an example of the constitution of equipment in which a battery pack is installed.

FIGS. 7 and 8 show examples of the constitutions of electronic equipment and a charger in which the battery pack 21 is installed. The battery pack 21 may be inserted into equipment or externally attached to the equipment. FIG. 7 illustrates the battery pack 21 inserted into a videotape tape recorder 51 with a camera, and FIG. 8 illustrates the battery pack 21 externally attached to a charger 61.

The battery pack 21 inserted into the videotape recorder 51 with a camera is described below. The videotape recorder 51 with a camera is provided under the view finder thereof with a space into which the battery pack 21 is to be inserted. Inside the space, electrodes are provided at positions corresponding to the electrodes of the battery pack 21, and convex portions are provide which correspond to the concave portions of the battery pack 21. For example, a projection 52 for preventing reverse battery pack insertion is formed to be as long as the groove 32A. As described above, the projection 52 prevents battery packs other than the batter pack 21, having a communication function and containing a lithium ion battery, from being inserted into the equipment.

Electrodes 30 and 31, indicated by broken lines in FIG. 7, are mated with the power supply terminals 25 and 26 of the battery pack 21 and electrically connected with the power supply terminals 25 and 26 to receive power supply when the battery pack is loaded into equipment.

A communication terminal 29, mated with the communication terminal 24 of the battery pack 21, is connected with the communication terminal 24 of the battery pack 21 to receive information on the amperage of current from the lithium ion battery, voltage, and the state of charge of the battery when the battery pack is loaded into the equipment. The communication terminal 29 gives a cue to the battery pack 21 to ask the battery pack to communicate information.

A charger 61 to be externally connected with the battery pack 21 is described below. A marker position changeover projection 62 and a locking projection 63 are provided along the center line on the installation surface of the charger 61 on which the battery pack 21 is placed. The marker position changeover projection pulls out the marker 39 when the battery pack is removed, and the locking projection secures the battery pack to the installation surface. Fitting projections 64A and 64B are provided on one side of the installation surface, and fitting projections 65A and 65B are provided on the other. These four fitting projections fit into the fitting grooves 40A, 40B, 41A, and 41B of the battery pack 21.

Figure 9:
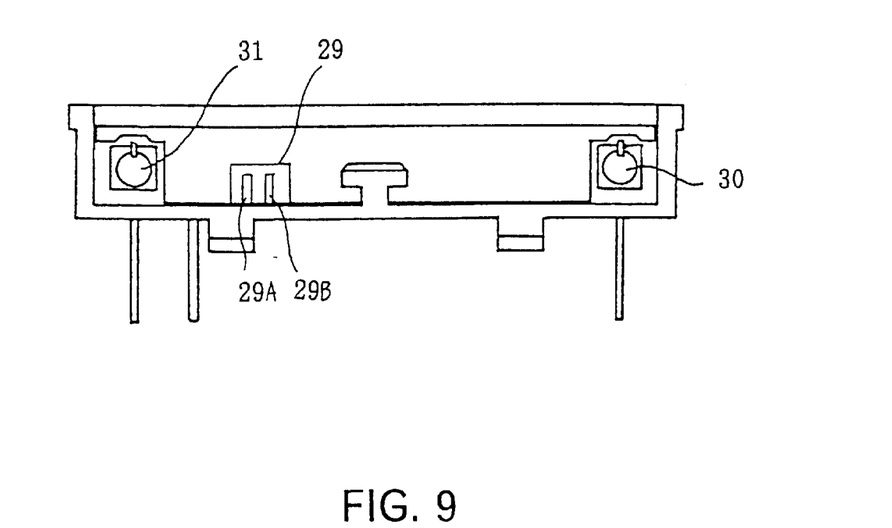
FIG. 9 is a schematic diagram showing a terminal constitution on a surface on which a battery pack is placed.

The electrodes 30 and 31, which are to be connected with the power supply terminals 25 and 26 of the battery pack 21 to apply charging voltage to the battery pack, and the communication terminal 29, which is to be connected with the communication terminal 24 to communicate information on the battery, are positioned opposite to the power supply terminals 25 and 26 and the communication terminal 24, respectively. As shown in FIG. 9, the communication terminal 29 is arranged so that it comes in contact with the communication terminal 24 of the battery pack 21 without failure.

In other words, the communication terminal 29 consists of two spring terminals 29A and 29B so that the communication-terminal 29 can elastically come in contact with the communication terminal 24 at two points. This allows at least one of the spring terminals 29A and 29B to securely come in contact with the communication terminal 24.

(3) Modifications

Note that, in the aforementioned embodiment, only the battery pack 21 containing a lithium ion battery is described, however the present invention is not limited thereto and other batteries can be applied as batteries for containing in packs.

Further, in the aforementioned embodiment, the communication terminal 24 of the battery pack 21 is formed to lie in not only the installation surface on which the power supply terminals 25 and 26 are provided but the bottom of the battery pack, so that the battery pack can be installed in equipment in two ways, however, the present invention is not limited thereto and a communication terminal can be formed only on the installation surface on which the power supply terminals 25 and 26 are provided.

Furthermore, in the aforementioned embodiment, the power supply terminals 25 and 26 of the battery pack 21 are provided, being a step down from the installation surface of the battery pack, so that the communication terminal 24 and the power supply terminals are at different levels, however, the present invention is not limited thereto and the communication terminal 24 and the power supply terminals 25 and 26 can be at the same level.

As described above, according to the present invention, providing a communication terminal, used to communicate the state of charge of a contained battery to external equipment, on the installation surface on which power supply terminals are provided or near the installation surface allows the communication terminal and power supply terminals of electronic equipment, into which the battery pack is loaded, to be concentrated at one place, thus reducing the terminal constitution of the electronic equipment in size.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A rechargeable battery, comprising:

a case;

a positive and a negative terminal located on the case;

a communication terminal located on the case for communicating information on a state of charge of the recharge battery to an external equipment, said communication terminal being located near the negative terminal and between the positive terminal and the negative terminal, wherein, said positive terminal, said negative terminal and one portion of said communication terminal are located on a first surface of the case;

a second portion of said communication terminal is located on a second surface of the case, and said first surface is located adjacent to said second surface.

2. A rechargeable battery according to claim 1, further comprising:

a microcomputer and means of communicating the information through said communication terminal, said microcomputer outputting the information indicated on the state of charge of the rechargeable battery.

3. A recharge battery according to claim 2, wherein said case is provided with a groove on a third surface thereof, the groove indicating that the rechargeable battery contains the microcomputer.

4. A recharge battery according to claim 3, wherein said case is located four concave portions and a groove on a center line of the second surface of the case, and the second surface is opposite from the first surface.

5. A recharge battery according to claim 1, wherein said positive terminal and said negative terminal are located in recesses on the first surface.

6. A recharge battery according to claim 1, wherein said case is located four concave portions and a groove on a center line of the second surface of the case, and said second portion of said communication terminal is adjacent to one of the four concave portions.

7. A rechargeable battery, comprising:

a case;

a positive and a negative terminal located on the case;

a communication terminal located on the case for communicating information on a state of charge of the recharge battery to an external equipment, and wherein said positive terminal, said negative terminal and one portion of said communication terminal are located on a first surface of the case, a second portion of said communication terminal is located on a second surface of the case, and said first surface is located adjacent to said second surface.

* * * * *